(12) United States Patent
Brickell

(10) Patent No.: US 10,250,392 B2
(45) Date of Patent: Apr. 2, 2019

(54) ARBITRARY BASE VALUE FOR EPID CALCULATION

(71) Applicant: Intel Corporation, Santa Clara, CA (US)

(72) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 15/200,477

(22) Filed: Jul. 1, 2016

(65) Prior Publication Data

US 2018/0006822 A1    Jan. 4, 2018

(51) Int. Cl.
| | |
|---|---|
| *H04L 9/08* | (2006.01) |
| *H04L 9/30* | (2006.01) |
| *H04L 9/32* | (2006.01) |

(52) U.S. Cl.
CPC ............ *H04L 9/3247* (2013.01); *H04L 9/088* (2013.01); *H04L 9/0833* (2013.01); *H04L 9/0872* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 2012/0173877 A1* | 7/2012 | Pendakur | G06F 21/123 713/169 |
| 2014/0089660 A1 | 3/2014 | Sarangshar et al. | |
| 2014/0095883 A1 | 4/2014 | Kirillov et al. | |
| 2014/0112471 A1 | 4/2014 | Pendakur et al. | |

OTHER PUBLICATIONS

Xiaoyu Ruan, 08/0/2014, Privacy at the next Level: Intell Enhanced Privacy Identification EPID Technology Platform Embedded Security Technology Revealed , pp. 11-141, Springer, first online Aug. 9, 2014.*
"International Application Serial No. PCT/US2017/031277, International Search Report dated Aug. 8, 2017", 3 pgs.
"International Application Serial No. PCT/US2017/031277, Written Opinion dated Aug. 8, 2017", 5 pgs.
Emal, Dyana, "Privacy Id Based Secret Attestation Scheme With Repudiation Capabilities", International Journal of Innovative Science Engineering and Technology (IJISET) vol. 1, Issue 2, (Apr. 2014).
Ernie, Brickell, "The Impact of Cryptography on Platform Security— RSA Conference", (Feb. 28, 2012), 10-15.

* cited by examiner

*Primary Examiner* — Fatoumata Traore
(74) *Attorney, Agent, or Firm* — Schwegman Lundberg & Woessner, P.A.

(57) ABSTRACT

Systems and methods for using an arbitrary base value for EPID calculations are provided herein. A system to use arbitrary base values in enhanced privacy ID (EPID) calculation, where the system includes a microcontroller; and a memory coupled to the microcontroller; wherein the microcontroller is to: obtain an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value; construct an EPID base using the arbitrary value; and transmit content signed with the private key using the EPID base to a verifier.

20 Claims, 4 Drawing Sheets

ARBITRARY BASE VALUE FOR EPID CALCULATION

TECHNICAL FIELD

Embodiments described herein generally relate to cryptography and in particular, to using an arbitrary base value for EPID calculation.

BACKGROUND

Enhanced Privacy ID (EPID) is a technique for attestation of a trusted system while preserving privacy of the signer. EPID is an enhancement of the Direct Anonymous Attestation (DAA) algorithm. DAA is a digital signature algorithm that support anonymity of the signing entities. DAA provides a common group public key that is associated with the group of private signature keys. Devices may use a private signature key to sign a message, which may then be verified using the group public verification key. The recipient is unable to determine which of the devices signed the message. EPID provides additional functionality over DAA.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
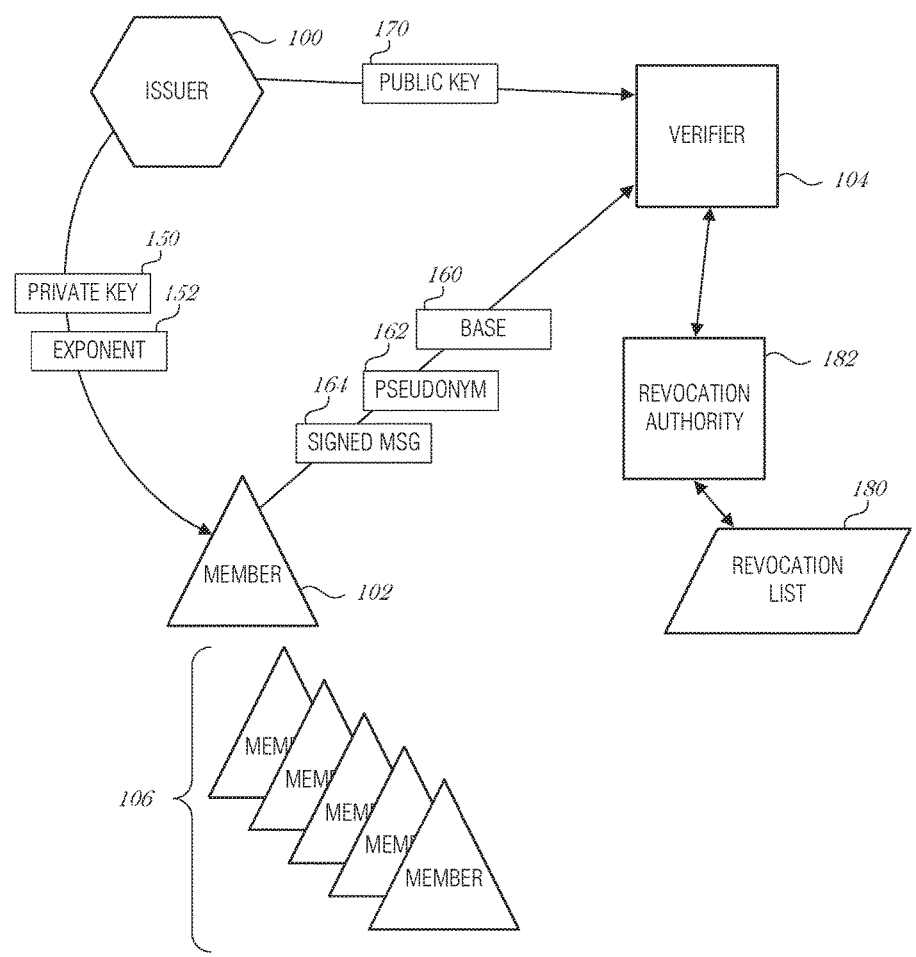
FIG. 1 is a diagram illustrating the entities involved in a time-based EPID implementation, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that use an arbitrary base value for EPID calculation. EPID provides a mechanism to sign a message or an attestation without revealing the identity of the signer. For some usages of EPID, it is a challenge to be able to maintain the privacy property, while also getting the necessary information to detect if an EPID signing key has been compromised. What is needed is a better mechanism to detect potentially compromised keys.

In all EPID schemes, there are three roles: Issuer, Member, and Verifier. The Issuer is the entity that issues unique EPID private keys for each Member of a group. A Member acquires a private key from the Issuer. The Member uses the private key to provide its membership. The Verifier checks the EPID signature to determine whether it was signed by an entity that is an authentic member of the group. The Verifier uses a public verification key to make this determination.

When the Issuer generates the private key for the Member, it may also identify a portion of the private key, which is referred to as the member exponent f. The member exponent f is provided to the Member when the private key is generated. When a Member signs a message, the Member includes the values B and K, where $K=B^f$, with the message. B is called the base and K is called the pseudonym.

Thus, when an EPID signature is generated, a pseudonym is computed as part of the signature. The pseudonym has the form $B^f$, where B is a non-secret base value, and f is a portion of the private key known only to the Member (signer). If the same Member signs two messages with the same base, then these two signatures will have the same pseudonym and may be linked as being signed with the same key. But if two messages are signed with different bases, then it is not possible to determine if they were signed with the same key.

In previous uses of EPID, two methods were used to choose the base: random base and name base. A random base method choose the base value randomly. This mechanism provides maximal privacy properties, but has a disadvantage in that it is difficult to determine if a key has been compromised, because a single compromised key may be used many times without being able to detect that it is the same key.

Using name base, the base is chosen as a fixed string perhaps derived from a name associated with the Verifier. For example, if the Verifier is "Big National Bank," a hash function may be used to transform the name to a numerical value, which may then be used as the base. As another example, the Verifier's public key may be used in a hash function to determine the base. This works well for some usages in which a Verifier does not expect to have many signatures from a single key. Under this expectation, the Verifier may suspect that a key is compromised if a large number of signatures are found based on that key.

The present disclosure provides additional mechanisms to derive a base from arbitrary values, in particular, time-based and usage-based values. For a time-based implementation, the time may be used alone or be combined with another value, such as the name of the Verifier. For a usage-based implementation, a counter may be initialized and incremented each time an EPID private key is used. These implementations are discussed further in the figures and text herein. Other aspects will become apparent in the following discussion.

FIG. 1 is a diagram illustrating the entities involved in a time-based EPID implementation, according to an embodiment. An Issuer 100, Member 102, and Verifier 104 are shown. The Member 102 may be a part of a group of members 106, with each member in the group of members 106 having its own private key and member exponent. The Issuer 100 issues a private key 150 and member exponent 152 to the Member 102 when the Member 102 first joins the group, when the Member 102 is first activated, or during the manufacture of the Member 102.

When the Member 102 wants to sign a message, it determines a base value derived from the time. The Member 102 may maintain the time using an internal clock after being initialized (e.g., set at a factory). For example, the Member 102 may be an Internet-of-Things (IoT) sensor, such as a thermostat, and have a clock circuit to maintain the current time. In another aspect the Member 102 may obtain the time each time the device is powered up, and then maintain the time after that. In another aspect, The Member 102 may communicate with a time server or other trusted time source when the time is needed to derive a base 160. The Member 102 generates the base 160 from the time and then transmits the base 160, the pseudonym (e.g., $B^f$) 162, and the signed message 164 to the Verifier 104. In another aspect, when the Member 102 is asked to sign a message, it receives the time from the Verifier 104, and the Member 102 checks whether the time received from the Verifier 104 is close enough to the time maintained by Member 102.

The Verifier 104 is provided the public verification key 170 from the Issuer 100. The Verifier 104 is able to validate the message's authenticity using the public verification key 170. In addition, the Verifier 104 may use the base 160 and pseudonym 162 and put this pseudonym 162 and signature on a list of used pseudonyms for this base name. If the Verifier 104 finds that the pseudonym 162 was already on the list, with a different signature, then the Verifier 104 will have proof that the pseudonym 162 was used more than once. The Verifier 104 may take actions based on that knowledge. The Verifier 104 may put the pseudonym 162 on an EPID signature revocation list, so that it will not accept any future signatures for any base from that private EPID signature key. The Verifier 104 may also provide the evidence to a Revocation Authority 182, so that the Revocation Authority 182 may put the pseudonym 162 on a signature revocation list issued by the Revocation Authority 182. In another aspect, the Revocation Authority 182 may offer the service of constructing and maintaining the list of used pseudonyms for each base name, and the check for duplications. In this case, the Verifier 104 passes the base 160 and pseudonym 162 and signature to the Revocation Authority 182 in order to check whether the key has already been used for this base name.

To determine whether the private key 150 is on the revoked list, the Revocation Authority 182 references the list 180. In an aspect, the revocation list 180 includes a list of pseudonyms and the Revocation Authority 182 provides a signed list of revoked pseudonyms to the Verifier 104. The Verifier 104 provides this signed list to the prover. When the prover signs a message with private key 150, the prover proves that private key 150 is not an exponent in any of the pseudonyms on the signed list. The method for doing this is included in the EPID papers.

In another aspect, the revocation list 180 includes a list of revoked exponent values that have become known to the Revocation Authority 182. In such an aspect, the Revocation Authority 182 (or verifier) will traverse the revocation list 180 and calculate the value $B^r$, where r is an exponent value from the revocation list 180, and determine whether any calculated $B^r$ value equals the received base 160. If so, then the exponent 152 of the Member 102 has been revoked and the message 164 is rejected, logged, quarantined, or otherwise processed. If the prover proves that his private exponent value was not used in any pseudonym on the revocation list, and Revocation Authority 182 cannot find either the pseudonym 162 or the exponent 152 in the revocation list 180, then the message 164 is considered authentic.

The Verifier 104 is able to perform additional checks the signed message 164 to determine whether the private key 150 has been compromised. In an aspect, the Verifier 104 logs each use of pseudonym 162. Because the pseudonym 162 is time-based, if the Verifier 104 logs a large number of uses of the pseudonym 162, then the Verifier 104 is able to determine that the same private key 150 has been used that number of times. If the private key is issued to a device that is expected to have a relatively low number of uses in a time period, then the numerosity of private key uses may indicate that the key has been compromised. Depending on the security policies in effect, the pseudonym 162 or the exponent may be placed on the revocation list 180, auditors may be alerted, or other actions may be performed.

In another aspect, the check of the number of times that a time-based pseudonym is used may be performed by the Revocation Authority 182. Many verifiers may be using the same time base. In this case, participating verifiers will send each signature to the Revocation Authority 182. The Revocation Authority 182 will maintain a master list of the pseudonyms for a particular time base from all of these verifiers. Then if there is a duplication of a pseudonym with different signatures, even if the signatures were sent to different verifiers, the Revocation Authority 182 is able to track this and take appropriate action.

Figure 2:
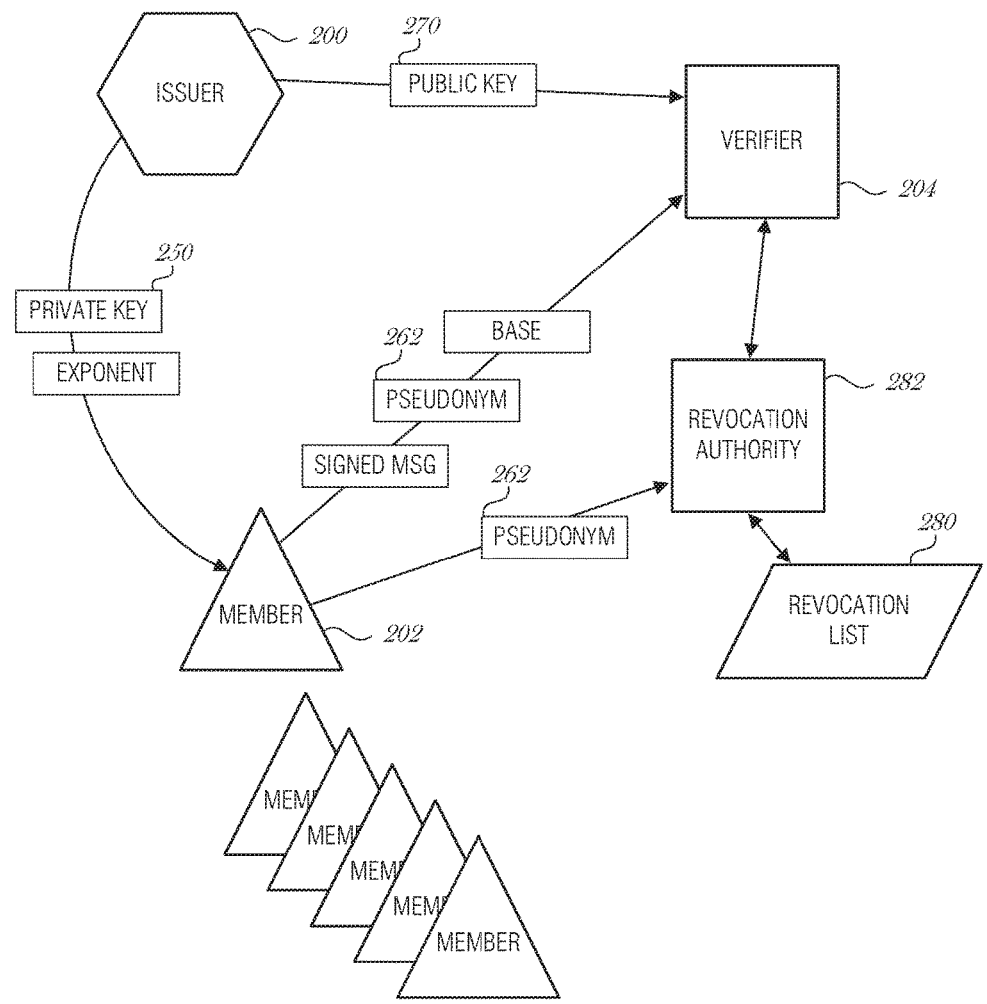
FIG. 2 is a diagram illustrating the entities involved in a usage-based EPID implementation, according to an embodiment.

FIG. 2 is a diagram illustrating the entities involved in a usage-based EPID implementation, according to an embodiment. Similar to that illustrated in FIG. 1, FIG. 2 includes an Issuer 200, a Member 202, and a Verifier 204. Instead of a time-based base value, as discussed in FIG. 1, the Member 202 uses a counter base. The initial value of the counter base may be some fixed initial value, InitialValue. Each time an EPID private key is used, the counter base value is used and then incremented by some value. For example, the counter base may be initialized to some small number, e.g., CounterBase=InitialValue. Then the base is set to CounterBase, and the CounterBase is incremented by one after each use.

Each time a signature is generated, the signature is sent to a Revocation Authority 282. This Revocation Authority 282 adds the signature and pseudonym 262 to a list of pseudonyms that have been used for each CounterBase. If the Revocation Authority 282 ever receives the same pseudonym 262 twice with different signatures, the Revocation Authority 282 is able to check those signatures, such as by having the Verifier 204 apply the public key 270. If both uses of the pseudonym 262 are valid, then the Revocation Authority 282 places that pseudonym 262 on the revocation list 280. It is possible that the private key 250 for the Member 202 has been compromised.

Certain restrictions may be placed on how and when the CounterBase is incremented so that it does not become a unique identifier able to identify the Member 202. For example, if an attacker were able to get CounterBase to increment greatly, it could become a unique identifier for the device. If there were a million devices in an EPID group, and it were possible to get CounterBases to increment to 100 million, then the attacker could get all of the devices to go to numbers about 100 apart, and then become relatively unique identifiers. Thus, in some embodiments, the CounterBase is restricted from becoming very large. There are various ways to do this, and different choices may be made on different devices. The present disclosure includes several options, although it is understood that other mechanisms are within the skill of one of ordinary skill.

As mentioned above, it is desirable to keep the counter from becoming too large. In an aspect, the usage policy is to only allow one use of the EPID per power reset of the part (Member 202). This works for parts that don't power reset more often than a few dozen times as day.

In another aspect, the usage policy may only allow one use of an EPID for each time the part (Member 202) is placed back into a factory default reset configuration. Note that this type of use of EPID is really only needed when the part originally ships, or when the part is resold. Thus, the number of times a pseudonym is used is relatively small.

In another aspect, the usage policy may only allow 100 or so uses of an EPID for each time the part is placed back into a factory default reset configuration.

When a part does go back into a factory default configuration, then there may be multiple signatures created with the same pseudonym. To accommodate this situation, the Revocation Authority 282 may allow a few uses, say five, so that the part could be sold five times. Alternatively, the Revocation Authority 282 may refer to the timing of the uses, such as by timestamping the uses, and determine whether the previous usage expired (e.g., over a year old) to indicate that the last factory default re-configuration happened a while ago, indicating that the part may have been resold and reinitialized to factory settings.

In another aspect, the usage policy may set a max limit for CounterBase. For example, the maximum CounterBase may be 1000. As such, if CounterBase gets this large, the only thing affected is being able to resell as a genuine part.

One use of an EPID is to prove that a part (e.g., a component of a machine) is genuine. In an example implementation, to establish that a part is genuine, the key should be issued by that part manufacturer. As an example, suppose that a Part 1 is produced by Manufacturer 1. Part 1 is then installed in a more complex Part 2 by Manufacturer 2. Part 2 was then installed in a more complex Part 3 by Manufacturer 3. In this scenario, Manufacturer 1 is only able assure that Part 1 was genuine, and the EPID key to do this would have to be installed by Manufacturer 1. Note that for Manufacturer 2 to use this to assert that the part was genuine, the EPID key would have to already have been provisioned in the part, or some other method of attestation would need to be used.

Manufacturer 2 could assure that Part 2 was genuine, and sign a nonce for a Trusted Execution Environment (TEE) app. Then. Manufacturer 3 would be able to assure that the Part 2 was genuine. Note, that this would require that the EPID key be provisioned by this time, or some other method of attestation be available.

Similarly, Manufacturer 3 could assure that Part 3 was genuine, and the EPID key to do this would have to be installed and issued by Manufacturer 3. Manufacturer 3 could itself assert the Part 1 and Part 2 it installed was genuine.

If an attacker is able to compromise a single EPID key and use it without detection, then the attacker could produce fraudulent devices, install this EPID key, and have the devices accepted as genuine. Thus, various usage policies may be enforced to cause a part to choose a different EPID base when being validated.

An example use case is appliance health reporting. The term appliance is meant to indicate any appliance or IoT device in the home, in an enterprise, in a factory, or in a car, in which the manufacturer of the device has a desire to monitor some characteristics of the device. The appliance provides to the manufacturer the amount of resource it is using (e.g., electricity, water, gas, etc.) at periodic intervals (e.g., every minute or every hour). This information may also include usage information of the device and indicators of wear of components in the device. The manufacturer uses this information to monitor the health of the appliance, gather information about aging, need for maintenance, analysis for improvements for future devices, advice on better usage, etc. The manufacture may want this information to be signed because it may take some costly action depending on the information. The reason that EPID is desired in this usage is that there is a potential privacy issue in that the information provided may indicate privacy sensitive information, such as whether a home is occupied or not, how busy a factory was, or driving habits in an auto. Because each appliance needs indicate its health and usage only periodically, the time based EPID is a preferred solution for protecting privacy and still being able to detect if a key has been used multiple times in an interval, thus indicating potential key compromise.

As another example use case, a traffic toll payment with an IoT device in a car to automatically pay tolls as it passes the toll booths. There are solutions to this today that do not offer privacy and require a different device for each local region. The payment to a device may be from preloading the device with some account information, or the device may keep a tally of the amount charged and then settle a later payment to clear the tally. In either case, there is a dependence upon the device to keep this information correct. Thus, there is a need for a secure way to tell that payment has been made. There is clearly a privacy issue in this usage. Given that the payment devices used today uniquely identify the device, a privileged employee could modify the software to track specific cars, and could try to profit from this information. Because any one car will pass a toll booth infrequently, say not more than once every 5 minutes, using a time-based EPID base works will for this usage.

By changing the time base frequently, say every 5 minutes, it would not be possible to use the EPID signatures to track any vehicle beyond the 5 minutes. But with national or global revocation checking, if a duplicated EPID key was in different vehicles, and these different vehicles passed different toll booths that are far apart during the 5 minute interval, this duplication of EPID keys would be detected, and the geographic distance would be clear evidence that the keys had been duplicated.

Figure 3:
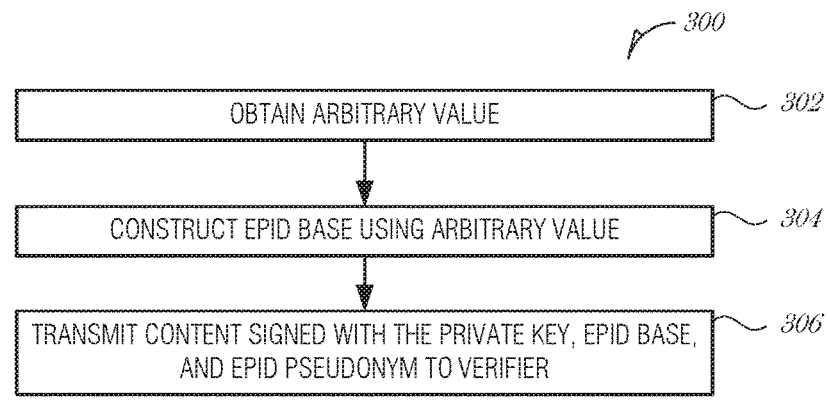
FIG. 3 is a flowchart illustrating a method of using arbitrary base values in enhanced privacy ID (EPID) calculations, according to an embodiment.

FIG. 3 is a flowchart illustrating a method 300 of using arbitrary base values in enhanced privacy ID (EPID) calculations, according to an embodiment. At block 302, an arbitrary value is obtained at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value.

At block 304, an EPID base is constructed using the arbitrary value. In an embodiment, the arbitrary value is a time-based value, and obtaining the arbitrary value includes accessing a real time close in the member device to obtain a current time and deriving the time-based value from the current time.

In an embodiment, the arbitrary value is a time-based value, and obtaining the arbitrary value includes querying a timeserver via a transceiver.

In an embodiment, deriving the time-based value includes truncating the current time to a nearest time interval and applying a deterministic crypto computation to derive the time-based value. For example, the member may obtain the correct time, and truncate the time to the time interval (e.g., if the time interval is 1 hour, and the correct time was 4:35 PM on Jan. 17, 2016, the device would use 4:00 PM on Jan. 17, 2016 as the time-based value). The member may then use a deterministic crypto computation, such as a hash function with padding added to generate the base from the time, and optionally include the verifier name as input to the crypto computation. Thus, in an embodiment, the deterministic crypto computation is a hash function.

In an embodiment, the nearest time interval is an hourly interval. In a related embodiment, the nearest time interval is a user-configurable interval.

In an embodiment, applying the deterministic crypto computation to derive the time-based value includes identifying a verifier name and using the verifier name as input to the deterministic crypto computation when deriving the time-based value.

In an embodiment, the arbitrary value is a usage-based value, and obtaining the arbitrary value includes accessing a current base value from a memory location in the member device, using the current base value to derive the usage-based value, and incrementing the current base value by an interval. The interval may be any step or interval, such as incrementing by 1, 5, or 10 from the current base value. Thus, in an embodiment, the interval is one.

In an embodiment, the method 300 includes enforcing a usage policy on the current base value. In a further embodiment, the usage policy comprises a maximum number of times that the current base value is allowed to be incremented, and in such an embodiment, enforcing the usage policy comprises aborting the constructing the EPID base using the arbitrary value and the transmitting content signed with the private key using the EPID base to the verifier.

In an embodiment, the method 300 includes producing at most one signature with the verifier name as the current base value for each specified system event. In an embodiment, the initial value a fixed value common in all devices using the same EPID group public key. The system event may be various events. In an embodiment, the system event comprises a factory reset. In another embodiment, the system event comprises a power cycle.

At block 306, content signed with the private EPID key using the EPID base is transmitted to a verifier. The verifier may perform additional actions, such as checking a revocation list or alerting an administrative user of a potentially compromised key.

Figure 4:
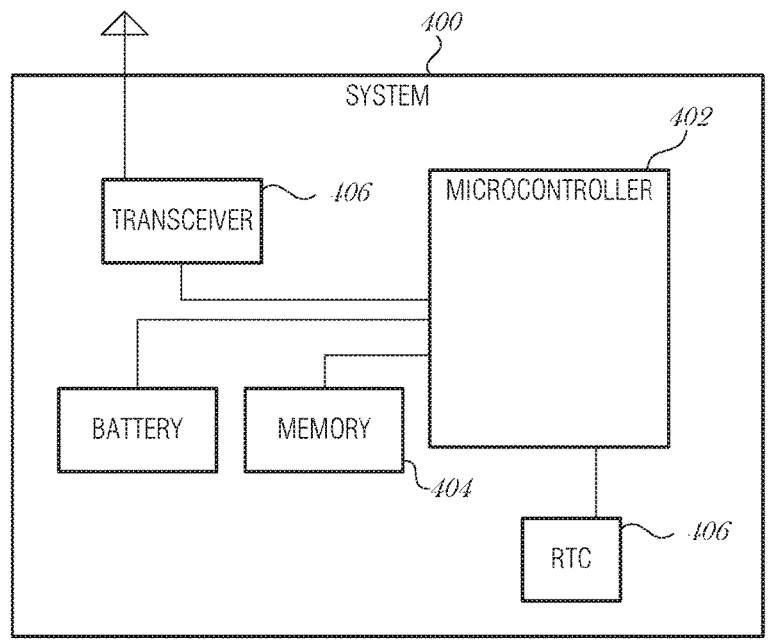
FIG. 4 is a block diagram illustrating a system to use arbitrary base values in enhanced privacy ID (EPID) calculation, according to an embodiment.

FIG. 4 is a block diagram illustrating a system 400 to use arbitrary base values in enhanced privacy ID (EPID) calculation, according to an embodiment. The system 400 includes a microcontroller 402 and a memory 404 coupled to the microcontroller 402. In an embodiment, the memory 404 comprises non-volatile memory.

In an embodiment, the microcontroller 402 is configured to obtain an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value.

The microcontroller 402 may be further configured to construct an EPID base using the arbitrary value. In an embodiment, the system 400 includes a real time clock 408. In such an embodiment, the arbitrary value is a time-based value, and to obtain the arbitrary value, the microcontroller 402 is to access the real time clock in the member device to obtain a current time and derive the time-based value from the current time.

In an embodiment, the system 400 includes a transceiver 406 coupled the microcontroller 402. In such an embodiment, to determine the time value, the microcontroller 402 is to query a timeserver via the transceiver 406.

In a further embodiment, to derive the time-based value, the microcontroller 402 is to truncate the current time to a nearest time interval and apply a deterministic crypto computation to derive the time-based value. In an embodiment, the deterministic crypto computation is a hash function. In a further embodiment, the nearest time interval is an hourly interval. In another embodiment, the nearest time interval is a user-configurable interval.

In an embodiment, to apply the deterministic crypto computation to the truncated time to derive the time-based value, the microcontroller 402 is to identify a verifier name and use the verifier name as input to the deterministic crypto computation when deriving the time-based value. The verifier name may be stored in the memory 404.

In an embodiment, the arbitrary value is a usage-based value, and to obtain the arbitrary value, the microcontroller 402 is to access a current base value from a memory location in the member device (e.g., memory 404), use the current base value to derive the usage-based value, and increment the current base value by an interval. In a further embodiment, the interval is one.

In an embodiment, the microcontroller 402 is to enforce a usage policy on the current base value. In a further embodiment, the usage policy comprises a maximum number of times that the current base value is allowed to be incremented, and to enforce the usage policy, the microcontroller 402 is to abort the constructing the EPID base using the arbitrary value and the transmitting content signed with the private key using the EPID base to the verifier.

In a further embodiment, the microcontroller 402 is to produce at most one signature with the verifier name as the current base value for each specified system event. In a related embodiment, the initial value a fixed value common in all devices using the same EPID group public key. In an embodiment, the system event comprises a factory reset. In another embodiment, the system event comprises a power cycle.

The microcontroller 402 may be further configured to transmit content signed with the private EPID key using the EPID base to a verifier.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 5:
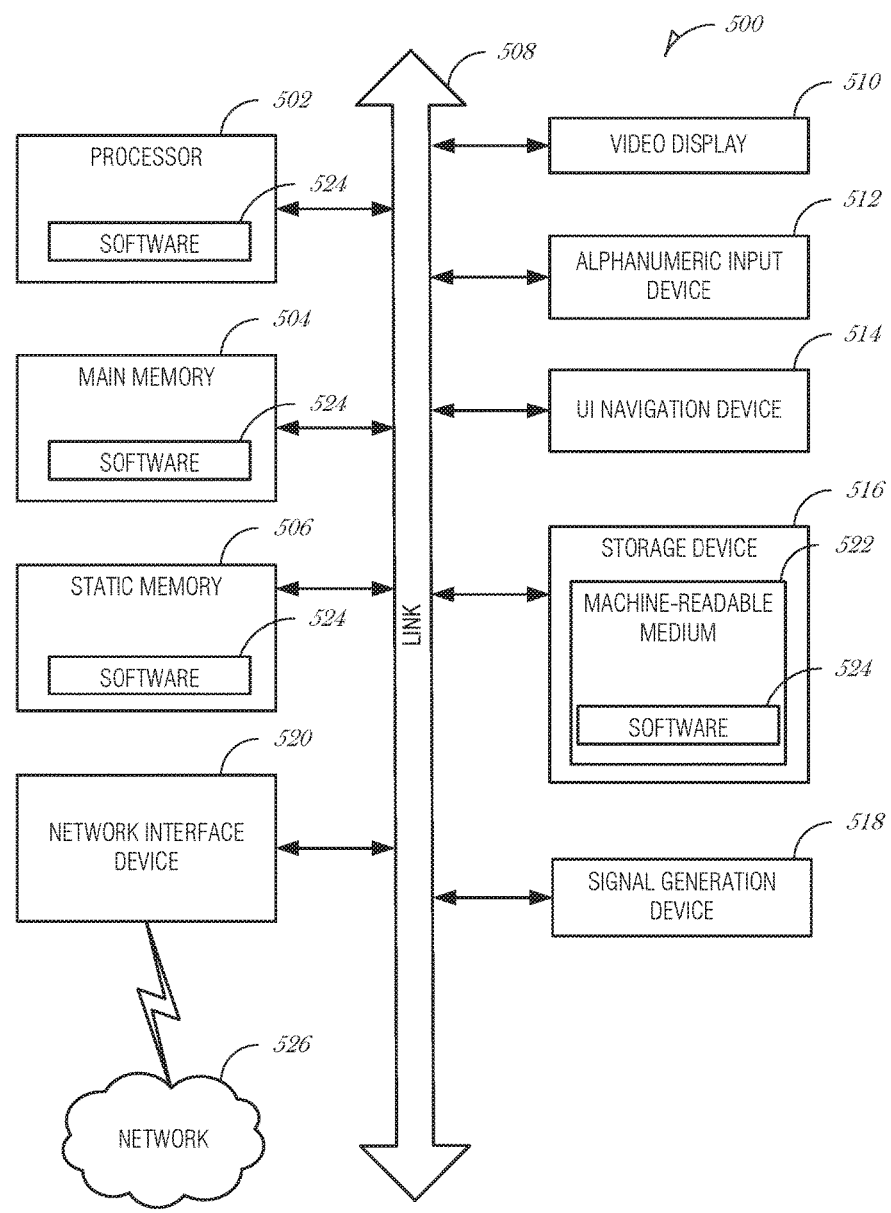
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further optionally include a video display unit 510, an alphanumeric input device 512 (e.g., a keyboard), and a user interface (UI) navigation device 514 (e.g., a mouse). In an embodiment, the video display unit 510, input device 512 and UI navigation device 514 are incorporated into a touch screen display. The computer system 500 may additionally optionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, infrared, camera, Hall effect magnetic sensor, ultrasound, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) comprising: a microcontroller; and a memory coupled to the microcontroller; wherein the microcontroller is to: obtain an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value; construct an EPID base using the arbitrary value; and transmit content signed with the private key using the EPID base to a verifier.

In Example 2, the subject matter of Example 1 may include, wherein the memory comprises non-volatile memory.

In Example 3, the subject matter of any one of Examples 1 to 2 may include, a real time clock; wherein the arbitrary value is a time-based value, and wherein to obtain the arbitrary value, the microcontroller is to: access the real time clock in the member device to obtain a current time; and derive the time-based value from the current time.

In Example 4, the subject matter of any one of Examples 1 to 3 may include, a transceiver coupled the microcontroller; wherein to determine the time value, the microcontroller is to query a timeserver via the transceiver.

In Example 5, the subject matter of any one of Examples 1 to 4 may include, wherein to derive the time-based value, the microcontroller is to: truncate the current time to a nearest time interval; and apply a deterministic crypto computation to the truncated time to derive the time-based value.

In Example 6, the subject matter of any one of Examples 1 to 5 may include, wherein the nearest time interval is an hourly interval.

In Example 7, the subject matter of any one of Examples 1 to 6 may include, wherein the nearest time interval is a user-configurable interval.

In Example 8, the subject matter of any one of Examples 1 to 7 may include, wherein to apply the deterministic crypto computation to derive the time-based value, the microcontroller is to: identify a verifier name; and use the verifier name as input to the deterministic crypto computation when deriving the time-based value.

In Example 9, the subject matter of any one of Examples 1 to 8 may include, wherein the deterministic crypto computation is a hash function.

In Example 10, the subject matter of any one of Examples 1 to 9 may include, wherein the arbitrary value is a usage-based value, and to obtain the arbitrary value, the microcontroller is to: access a current base value from a memory location in the member device; use the current base value to derive the usage-based value; and increment the current base value by an interval.

In Example 11, the subject matter of any one of Examples 1 to 10 may include, wherein the interval is one.

In Example 12, the subject matter of any one of Examples 1 to 11 may include, wherein the microcontroller is to enforce a usage policy on the current base value.

In Example 13, the subject matter of any one of Examples 1 to 12 may include, wherein the usage policy comprises a maximum number of times that the current base value is allowed to be incremented, and wherein to enforce the usage policy, the microcontroller is to abort the constructing the EPID base using the arbitrary value and the transmitting content signed with the private key using the EPID base to the verifier.

In Example 14, the subject matter of any one of Examples 1 to 13 may include, wherein the microcontroller is to produce at most one signature with the verifier name as the current base value for each specified system event.

In Example 15, the subject matter of any one of Examples 1 to 14 may include, wherein the initial value a fixed value common in all devices using the same EPID group public key.

In Example 16, the subject matter of any one of Examples 1 to 15 may include, wherein the system event comprises a factory reset.

In Example 17, the subject matter of any one of Examples 1 to 16 may include, wherein the system event comprises a power cycle.

Example 18 includes subject matter (such as a method, means for performing acts, machine readable medium including instructions that when performed by a machine cause the machine to performs acts, or an apparatus to perform) comprising: obtaining an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value; constructing an EPID base using the arbitrary value; and transmitting content signed with the private key using the EPID base to a verifier.

In Example 19, the subject matter of Example 18 may include, wherein the arbitrary value is a time-based value, and obtaining the arbitrary value comprises: accessing a real time close in the member device to obtain a current time; and deriving the time-based value from the current time.

In Example 20, the subject matter of any one of Examples 18 to 19 may include, wherein the arbitrary value is a time-based value, and obtaining the arbitrary value comprises querying a timeserver via the transceiver.

In Example 21, the subject matter of any one of Examples 18 to 20 may include, wherein deriving the time-based value comprises: truncating the current time to a nearest time interval; and applying a deterministic crypto computation to the truncated time to derive the time-based value.

In Example 22, the subject matter of any one of Examples 18 to 21 may include, wherein the nearest time interval is an hourly interval.

In Example 23, the subject matter of any one of Examples 18 to 22 may include, wherein the nearest time interval is a user-configurable interval.

In Example 24, the subject matter of any one of Examples 18 to 23 may include, wherein applying the deterministic crypto computation to derive the time-based value comprises: identifying a verifier name; and using the verifier name as input to the deterministic crypto computation when deriving the time-based value.

In Example 25, the subject matter of any one of Examples 18 to 24 may include, wherein the deterministic crypto computation is a hash function.

In Example 26, the subject matter of any one of Examples 18 to 25 may include, wherein the arbitrary value is a usage-based value, and obtaining the arbitrary value comprises: accessing a current base value from a memory location in the member device; using the current base value to derive the usage-based value; and incrementing the current base value by an interval.

In Example 27, the subject matter of any one of Examples 18 to 26 may include, wherein the interval is one.

In Example 28, the subject matter of any one of Examples 18 to 27 may include, enforcing a usage policy on the current base value.

In Example 29, the subject matter of any one of Examples 18 to 28 may include, wherein the usage policy comprises a maximum number of times that the current base value is allowed to be incremented, and wherein enforcing the usage policy comprises aborting the constructing the EPID base using the arbitrary value and the transmitting content signed with the private key using the EPID base to the verifier.

In Example 30, the subject matter of any one of Examples 18 to 29 may include, producing at most one signature with the verifier name as the current base value for each specified system event.

In Example 31, the subject matter of any one of Examples 18 to 30 may include, wherein the initial value is a fixed value common in all of the devices using the same EPID group public key.

In Example 32, the subject matter of any one of Examples 18 to 31 may include, wherein the system event comprises a factory reset.

In Example 33, the subject matter of any one of Examples 18 to 32 may include, wherein the system event comprises a power cycle.

Example 34 includes at least one machine-readable medium including instructions, which when executed by a machine, cause the machine to perform operations of any of the Examples 18-33.

Example 35 includes an apparatus comprising means for performing any of the Examples 18-33.

Example 36 includes subject matter (such as a device, apparatus, or machine) comprising: means for obtaining an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value; means for constructing an EPID base using the arbitrary value; and means for transmitting content signed with the private key using the EPID base to a verifier.

In Example 37, the subject matter of Example 36 may include, wherein the arbitrary value is a time-based value, and the means for obtaining the arbitrary value comprise: means for accessing a real time close in the member device to obtain a current time; and means for deriving the time-based value from the current time.

In Example 38, the subject matter of any one of Examples 36 to 37 may include, wherein the arbitrary value is a time-based value, and the means for obtaining the arbitrary value comprise means for querying a timeserver via the transceiver.

In Example 39, the subject matter of any one of Examples 36 to 38 may include, wherein the means for deriving the time-based value comprise: means for truncating the current time to a nearest time interval; and means for applying a deterministic crypto computation to the truncated time to derive the time-based value.

In Example 40, the subject matter of any one of Examples 36 to 39 may include, wherein the nearest time interval is an hourly interval.

In Example 41, the subject matter of any one of Examples 36 to 40 may include, wherein the nearest time interval is a user-configurable interval.

In Example 42, the subject matter of any one of Examples 36 to 41 may include, wherein the means for applying the deterministic crypto computation to derive the time-based value comprise: means for identifying a verifier name; and means for using the verifier name as input to the deterministic crypto computation when deriving the time-based value.

In Example 43, the subject matter of any one of Examples 36 to 42 may include, wherein the deterministic crypto computation is a hash function.

In Example 44, the subject matter of any one of Examples 36 to 43 may include, wherein the arbitrary value is a usage-based value, and the means for obtaining the arbitrary value comprise: means for accessing a current base value from a memory location in the member device; means for using the current base value to derive the usage-based value; and means for incrementing the current base value by an interval.

In Example 45, the subject matter of any one of Examples 36 to 44 may include, wherein the interval is one.

In Example 46, the subject matter of any one of Examples 36 to 45 may include, means for enforcing a usage policy on the current base value.

In Example 47, the subject matter of any one of Examples 36 to 46 may include, wherein the usage policy comprises a maximum number of times that the current base value is allowed to be incremented, and wherein the means for enforcing the usage policy comprise means for aborting the constructing the EPID base using the arbitrary value and the transmitting content signed with the private key using the EPID base to the verifier.

In Example 48, the subject matter of any one of Examples 36 to 47 may include, means for producing at most one signature with the verifier name as the current base value for each specified system event.

In Example 49, the subject matter of any one of Examples 36 to 48 may include, wherein the initial value is a fixed value common in all of the devices using the same EPID group public key.

In Example 50, the subject matter of any one of Examples 36 to 49 may include, wherein the system event comprises a factory reset.

In Example 51, the subject matter of any one of Examples 36 to 50 may include, wherein the system event comprises a power cycle.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system to use arbitrary base values in enhanced privacy ID (EPID) calculation, the system comprising:
   a microcontroller; and
   a memory coupled to the microcontroller;
   wherein the microcontroller is to:
      obtain an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value;
      construct an EPID base using the arbitrary value; and
      transmit content signed with the private key using the EPID base to a verifier,
   wherein to obtain the time-based value, the microcontroller is to:
      truncate a current time to a nearest time interval; and
      apply a deterministic crypto computation to the truncated time to derive the time-based value; and
   wherein to obtain the usage-based value, the microcontroller is to:
      access a current base value from a memory location in the member device;
      use the current base value to derive the usage-based value; and
      increment the current base value by an interval.

2. The system of claim 1, Therein the memory comprises non-volatile memory.

3. The system of claim 1, further comprising a real time clock;
   wherein to obtain the time-based value, the microcontroller is to:
      access the real time clock in the member device to obtain the current time; and
      derive the time-based value from the current time.

4. The system of claim 1, further comprising a transceiver coupled the microcontroller;
   wherein to determine the time-based value, the microcontroller is to query a timeserver via the transceiver.

5. The system of claim 1, wherein the nearest time interval is an hourly interval.

6. The system of claim 1, wherein the nearest time interval is a user-configurable interval.

7. The system of claim 1, wherein to apply the deterministic crypto computation to derive the time-based value, the microcontroller is to:
   identify a verifier name; and
   use the verifier name as input to the deterministic crypto computation when deriving the time-based value.

8. The system of claim 1, wherein the deterministic crypto computation is a hash function.

9. The system of claim 1, wherein the interval is one.

10. The system of claim 1, wherein the microcontroller is to enforce a usage policy on the current base value.

11. The system of claim 10, wherein the usage policy comprises a maximum number of times that the current base value is allowed to be incremented, and wherein to enforce the usage policy, the microcontroller is to abort the constructing the EPID base using the arbitrary value and the transmitting content signed with the private key using the EPID base to the verifier.

12. The system of claim 10, wherein the microcontroller is to produce at most one signature with the verifier name as the current base value for each specified system event.

13. The system of claim 12, wherein the initial value a fixed value common in all devices using the same EPID group public key.

14. The system of claim 12, wherein the system event comprises a factory reset.

15. The system of claim 12, wherein the system event comprises a power cycle.

16. A method of using arbitrary base values in enhanced privacy ID (EPID) calculations, the method comprising:
   obtaining an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value;
   constructing an EPID base using the arbitrary value; and
   transmitting content signed with the private key using the EPID base to a verifier;

wherein obtaining the time-based value comprises:
  querying a timeserver via a transceiver to obtain a current time;
  truncating the current time to a nearest time interval; and
  applying a deterministic crypto computation to the truncated time to derive the time-based value.

17. The method of claim 16, wherein the arbitrary value is a time-based value, and obtaining the arbitrary value comprises:
  accessing a real time clock in the member device to obtain the current time; and
  deriving the time-based value from the current time.

18. The method of claim 16, wherein the arbitrary value is a usage-based value, and obtaining the arbitrary value comprises:
  accessing a current base value from a memory location in the member device;
  using the current base value to derive the usage-based value; and
  incrementing the current base value by an interval.

19. At least one non-transitory machine-readable medium including instructions for using arbitrary base values in enhanced privacy ID (EPID) calculations, which when executed by a machine, cause the machine to:
  obtain an arbitrary value at a member device, the member device being a member of a group of member devices, each member device in the group of member devices having a unique private EPID key assigned from a pool of private keys, where any of the pool of private keys is able to sign content that is verifiable by a single group public key, and the arbitrary value being one of a time-based value or a usage-based value;
  construct an EPID base using the arbitrary value; and
  transmit content signed with the private key using the EPID base to a verifier,
  wherein the instructions to obtain the time-based value comprise
  instructions to:
    query a timeserver via a transceiver to obtain a current time;
    truncate the current time to a nearest time interval; and
    apply a deterministic crypto computation to the truncated time to derive the time-based value.

20. The non-transitory machine-readable medium of claim 19, wherein the arbitrary value is a time-based value, and the instructions to obtain the arbitrary value comprise instructions to:
  access a real time clock in the member device to obtain the current time; and
  derive the time-based value from the current time.

* * * * *

UNITED STATES PATENT AND TRADEMARK OFFICE
CERTIFICATE OF CORRECTION

PATENT NO. : 10,250,392 B2
APPLICATION NO. : 15/200477
DATED : April 2, 2019
INVENTOR(S) : Ernie F. Brickell It is certified that error appears in the above-identified patent and that said Letters Patent is hereby corrected as shown below:

In the Claims

In Column 16, Line 8, in Claim 2, delete "Therein" and insert --wherein-- therefor In Column 18, Line 11, in Claim 19, after "comprise", delete "¶"

Signed and Sealed this
Twenty-first Day of April, 2020

Andrei Iancu
*Director of the United States Patent and Trademark Office*